US006829643B1

(12) United States Patent
Tobe et al.

(10) Patent No.: US 6,829,643 B1
(45) Date of Patent: Dec. 7, 2004

(54) NETWORK CONTROL APPARATUS HAVING BANDWIDTH CONTROL METHOD SELECTION ASSOCIATED TO USERS UTILIZING STATUS TABLES, RANKING TABLES, AND TOTAL POINTS OF USER'S INFORMATION PARAMETERS

(75) Inventors: Teruo Tobe, Kawasaki (JP); Hitoshi Ohura, Kawasaki (JP); Yoshiki Suzuki, Kawasaki (JP); Kazuhiko Yanagidate, Kawasaki (JP); Hiroshi Kobayashi, Yokohama (JP)

(73) Assignee: Fujitsu Limited, Kawasaki (JP)

( * ) Notice: Subject to any disclaimer, the term of this patent is extended or adjusted under 35 U.S.C. 154(b) by 753 days.

(21) Appl. No.: 09/716,775

(22) Filed: Nov. 20, 2000

(30) Foreign Application Priority Data

Feb. 1, 2000 (JP) ........................................ 2000-024128

(51) Int. Cl.[7] ........................................... G06F 15/173
(52) U.S. Cl. ...................... 709/226; 709/224; 709/225; 709/229; 709/235
(58) Field of Search ................................. 709/200–310

(56) References Cited

U.S. PATENT DOCUMENTS

| 6,424,624 B1 | * | 7/2002 | Galand et al. | .............. 370/231 |
| 6,625,643 B1 | * | 9/2003 | Colby et al. | ................ 709/217 |
| 2001/0003830 A1 | * | 6/2001 | Nielsen | ...................... 709/226 |

FOREIGN PATENT DOCUMENTS

| JP | 08079305 | 3/1996 |
| JP | 09200270 | 7/1997 |
| JP | 11122279 | 4/1999 |

* cited by examiner

Primary Examiner—Nabil El-Hady
(74) Attorney, Agent, or Firm—Katten Muchin Zavis Rosenman (57) ABSTRACT

In a network control apparatus which can dynamically control a bandwidth corresponding to a traffic status of a user flexibly, when a whole traffic quantity of a packet passing through the network exceeds a threshold value, per-user-information is analyzed based on a database holding packet information, and a bandwidth control method in conformity with the result of the analysis is selected to perform/release the bandwidth control.

7 Claims, 6 Drawing Sheets

| | AVERAGE TRAFFIC QUANTITY (bps) | AVERAGE COMMUNICATION DATA QUANTITY (byte) | AVERAGE PACKET NUMBER | AVERAGE CONNECTION NUMBER | AVERAGE SESSION TIME (h) |
|---|---|---|---|---|---|
| MON. | 54389 | 34579 | 41239847 | 4 | 1.2 |
| TUE. | 4569 | 5378495 | 52398187 | 12 | 0.8 |
| WED. | 2384092 | 234798 | 13824978 | 23 | 4.3 |
| THU. | 34789 | 53478 | 1248330 | 34 | 2.9 |
| FRI. | 4387 | 435893 | 384032980 | 44 | 3 |
| SAT. | 2340 | 237489 | 1384597 | 83 | 2.1 |
| SUN. | 23080556 | 42398 | 38423570148 | 2 | 5 |

| RANKING | USER WITH HIGHER TRAFFIC (IP ADDRESS) | | | | |
|---|---|---|---|---|---|
| | AVERAGE TRAFFIC QUANTITY (bps) | AVERAGE COMMUNICATION DATA QUANTITY (byte) | AVERAGE PACKET NUMBER | AVERAGE CONNECTION NUMBER | AVERAGE SESSION TIME (h) |
| 1 | a.a.a.a | a.a.a.a | a.a.a.a | b.b.b.b | a.a.a.a |
| 2 | b.b.b.b | c.c.c.c | b.b.b.b | a.a.a.a | b.b.b.b |
| 3 | c.c.c.c | b.b.b.b | d.d.d.d | d.d.d.d | c.c.c.c |
| 4 | d.d.d.d | d.d.d.d | c.c.c.c | c.c.c.c | d.d.d.d |
| . | . | . | . | . | . |
| . | . | . | . | . | . |
| . | . | . | . | . | . |
| n | z.z.z.z | z.z.z.z | z.z.z.z | z.z.z.z | z.z.z.z |

| TOTAL POINT | BANDWIDTH CONTROL METHOD | COMMAND |
|---|---|---|
| 4 | ·TRANSMITTING PACKET TO PARTITION ① FOR BANDWIDTH OCCUPANT (10% ENCLOSURE OF WHOLE BANDWIDTH) <br> ·PASSING PACKET THROUGH PARTITION ⑥ FOR BANDWIDTH OCCUPANT; SET PRIORITY VALUE WITH "1" | ·COMMAND FOR SETTING CONTROL ① <br> ·COMMAND FOR SETTING CONTROL ⑥ |
| 3 | ·TRANSMITTING PACKET TO PARTITION ① FOR BANDWIDTH OCCUPANT (10% ENCLOSURE OF WHOLE BANDWIDTH) <br> ·PASSING PACKET THROUGH PARTITION ⑤ FOR BANDWIDTH OCCUPANT; SET PRIORITY VALUE WITH "2" | ·COMMAND FOR SETTING CONTROL ① <br> ·COMMAND FOR SETTING CONTROL ⑤ |
| 2 | ·TRANSMITTING PACKET TO PARTITION ① FOR BANDWIDTH OCCUPANT (10% ENCLOSURE OF WHOLE BANDWIDTH) <br> ·PASSING PACKET THROUGH PARTITION ④ FOR BANDWIDTH OCCUPANT; SET PRIORITY VALUE WITH "3" | ·COMMAND FOR SETTING CONTROL ① <br> ·COMMAND FOR SETTING CONTROL ④ |
| 1 | ·TRANSMITTING PACKET TO PARTITION ① FOR BANDWIDTH OCCUPANT (10% ENCLOSURE OF WHOLE BANDWIDTH) <br> ·PASSING PACKET THROUGH PARTITION ③ FOR BANDWIDTH OCCUPANT; SET PRIORITY VALUE WITH "4" | ·COMMAND FOR SETTING CONTROL ① <br> ·COMMAND FOR SETTING CONTROL ③ |
| 0 | ·TRANSMITTING PACKET TO PARTITION ① FOR BANDWIDTH OCCUPANT (10% ENCLOSURE OF WHOLE BANDWIDTH) <br> ·PASSING PACKET THROUGH PARTITION ② FOR BANDWIDTH OCCUPANT; SET PRIORITY VALUE WITH "5" | ·COMMAND FOR SETTING CONTROL ① <br> ·COMMAND FOR SETTING CONTROL ② |

※ HIGHER PRIORITY VALUE INDICATES HIGHER PRIORITY

| IP ADDRESS | TOTAL POINT |
|---|---|
| a. a. a. a | 4 |
| b. b. b. b | 0 |
| c. c. c. c | 1 |
| d. d. d. d | 3 |
| . | . |
| . | . |
| . | . |
| z. z. z. z | 2 |

FIG.7

NETWORK CONTROL APPARATUS HAVING BANDWIDTH CONTROL METHOD SELECTION ASSOCIATED TO USERS UTILIZING STATUS TABLES, RANKING TABLES, AND TOTAL POINTS OF USER'S INFORMATION PARAMETERS

BACKGROUND OF THE INVENTION

1. Field of the Invention

The present invention relates to a network control apparatus, and in particular to a bandwidth control apparatus in a network such as an Internet service provider which provides an Internet access and an in-enterprise LAN.

In the network control apparatus, a traffic quantity within the network, or with respect to the Internet or the like as a backbone network connected to the outside changes with time as a utilizing status (availability) of user changes. Therefore, it is required to control the bandwidth of the network according to such a change of the traffic quantity.

2. Description of the Related Art

Figure 7:
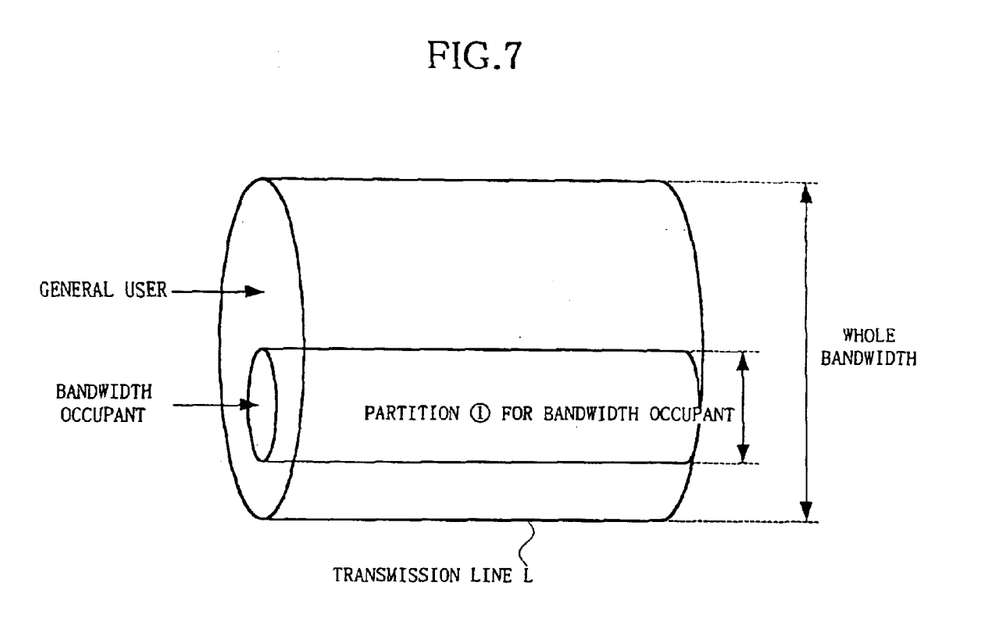
FIG. 7 is a diagram illustrating a partition for a bandwidth occupant used in an LAN network control apparatus according to the present invention.

For a bandwidth control in a prior art LAN network control apparatus, as shown in FIG. 7, such control methods have been adopted that a partition (area) is statically set over a whole bandwidth of a transmission line L to secure traffic channels independent of each other, thereby improving a quality of service (QoS), and that a priority for using a bandwidth per user is statically set.

The prior art LAN network control apparatus using the above-mentioned bandwidth control methods performs the bandwidth control by static setting. Therefore, when a file is transferred at one time by a method such as an FTP (File Transfer Protocol), or a plurality of connections are started up, the apparatus can not flexibly deal with a utilizing status of the inside of the LAN network or a backbone changing with time. Accordingly, there has been a problem that a stable quality of service can not be always maintained.

SUMMARY OF THE INVENTION

It is accordingly an object of the present invention to provide a network control apparatus which can dynamically control a bandwidth flexibly corresponding to a traffic status of a user.

Figure 1:
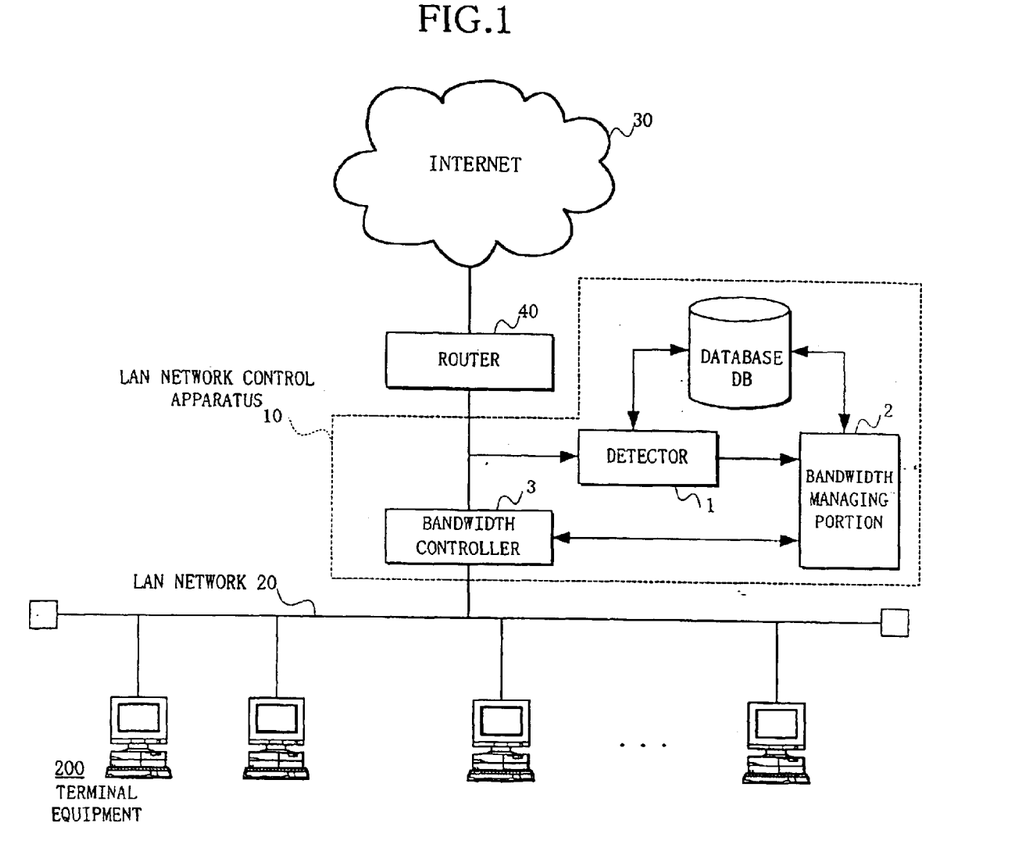
FIG. 1 is a schematic diagram showing an arrangement of an LAN network control apparatus exemplified for a network control apparatus according to the present invention.

FIG. 1 shows a schematic arrangement of a network control apparatus according to the present invention. A portion 10 shown by a dotted line indicates an LAN network control apparatus exemplified for a network control apparatus according to the present invention, which is connected to an LAN network 20 connecting terminal equipments 200 such as personal computers and to the Internet 30 as a backbone, e.g. through a router 40.

The LAN network control apparatus 10 comprises a detector 1 for detecting a packet passing through a network and a fact that a whole traffic quantity exceeds a predetermined threshold value, a database DB for holding packet information per user detected by the detector 1, a bandwidth managing portion 2 for detecting a bandwidth occupant based on the information per user in the database DB and for selecting a corresponding bandwidth control method when the detector 1 has detected that the whole traffic quantity has exceeded the predetermined threshold value, and a bandwidth controller 3 for performing a bandwidth control to the bandwidth occupant based on the bandwidth control method selected by the bandwidth managing portion 2.

The arrangement of the present invention shown in FIG. 1 will now be described referring to a schematic diagram of an operation diagram shown in FIG. 2.

In the present invention, the detector 1 firstly detects a packet passing through the network such as a route leading to the LAN network 20 from the Internet 30, and monitors the whole traffic quantity of the network to write the information per user (per-user-information) in the database DB (at step S1).

The detector 1 further determines whether or not the traffic quantity of the whole network exceeds a predetermined threshold value (at step S2).

As a result, when it is found that the whole traffic quantity exceeds the predetermined threshold value, the bandwidth managing portion 2 which has received this notification detects which user occupies the bandwidth referring to a utilizing status table T1 per user (per-user-utilizing status table) and a user order table T2 written in the database DB (at step S3), selects the bandwidth control method corresponding to the user based on a bandwidth control method selection table T3 preliminarily provided in the database DB (at step S4), and notifies the bandwidth controller 3 of the selected method. It is to be noted that "bandwidth occupation" includes the status of utilizing a part of the bandwidth of the transmission line.

Receiving the notification from the bandwidth managing portion 2, the bandwidth controller 3 performs the bandwidth control (set/release) (at step S5).

The above-mentioned detector 1 may have a variable value as the predetermined threshold value.

The above-mentioned per-user-utilizing status table T1 may include at least one of an average traffic quantity, an average communication data quantity, an average packet number, an average connection number, and an average session time as a parameter of the per-user-information.

Also, the user order table T2 indicates a ranking (order) of users in respect of each parameter of the per-user-information. The bandwidth managing portion 2 may detect a highest ranking bandwidth occupant at one specified parameter based on the user ranking table T2 (at step S2), determine whether or not the value of another parameter exceeds a corresponding predetermined threshold value by referring to the per-user-utilizing status table T1 when the value of the specified parameter at this time exceeds a corresponding predetermined threshold value, gives points indicating a bandwidth occupation degree when the threshold value is exceeded, and select a bandwidth control method based on the current point from the bandwidth control method selection table T3 (at step S4).

The selection table T3 indicates a correspondence between the point and the bandwidth control method. The bandwidth control method may have contents of the transmission of packet to a partition for a bandwidth occupant and a priority at the time the packet is passed through the partition.

Furthermore, the bandwidth managing portion 2 may use the total value of the above-mentioned points of the parameters.

Moreover, the database DB may have a total point table T4 per user (per-user-total point table) indicating a correspondence between each user and the total point. When the whole traffic quantity is less than the predetermined threshold value after performing the bandwidth control (at step S5), the bandwidth controller 3 may sequentially release the bandwidth control in order from a user with a smaller point, based on the per-user-total point table T4 (at step S5), whereby the bandwidth managing portion 2 may clear the point of the user where bandwidth control is released, from the per-user-total point table T4.

Thus, in this invention, the bandwidth control can be performed according to the whole traffic quantity and the bandwidth availability of the user with a higher traffic quantity, so that it becomes possible to perform a flexible control corresponding to the bandwidth availability changing with time.

BRIEF DESCRIPTION OF THE DRAWINGS

Throughout the figures, like reference numerals indicate like or corresponding components.

DESCRIPTION OF THE EMBODIMENTS

Figure 2:
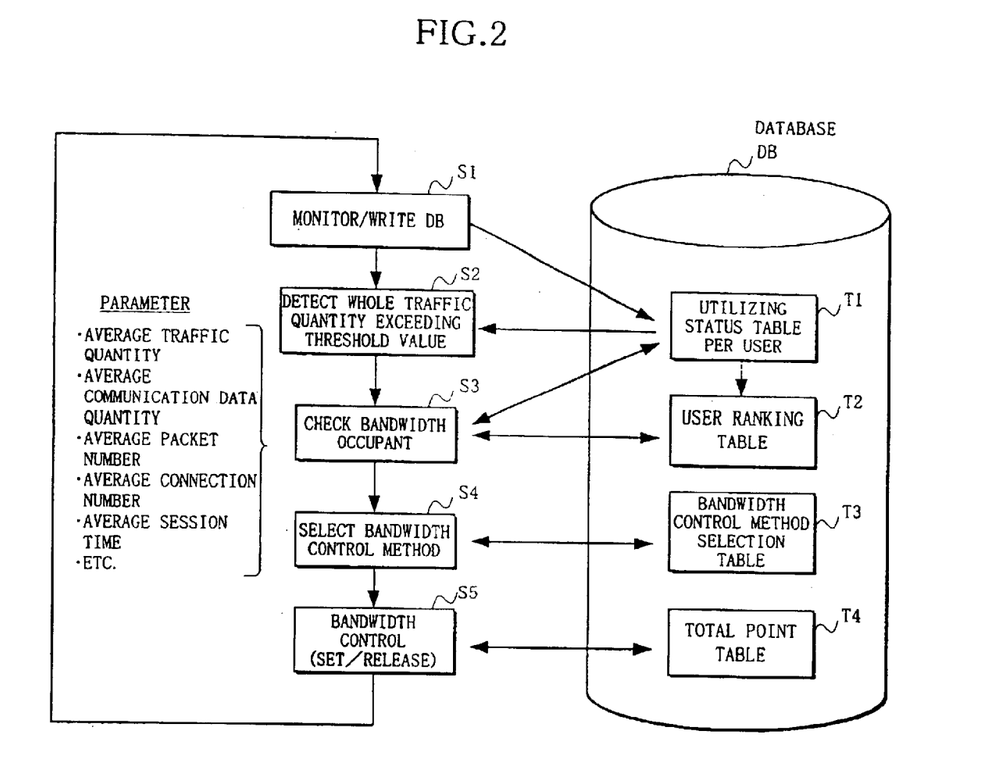
FIG. 2 is a schematic diagram showing an operation of an LAN network control apparatus according to the present invention.
Figure 3:
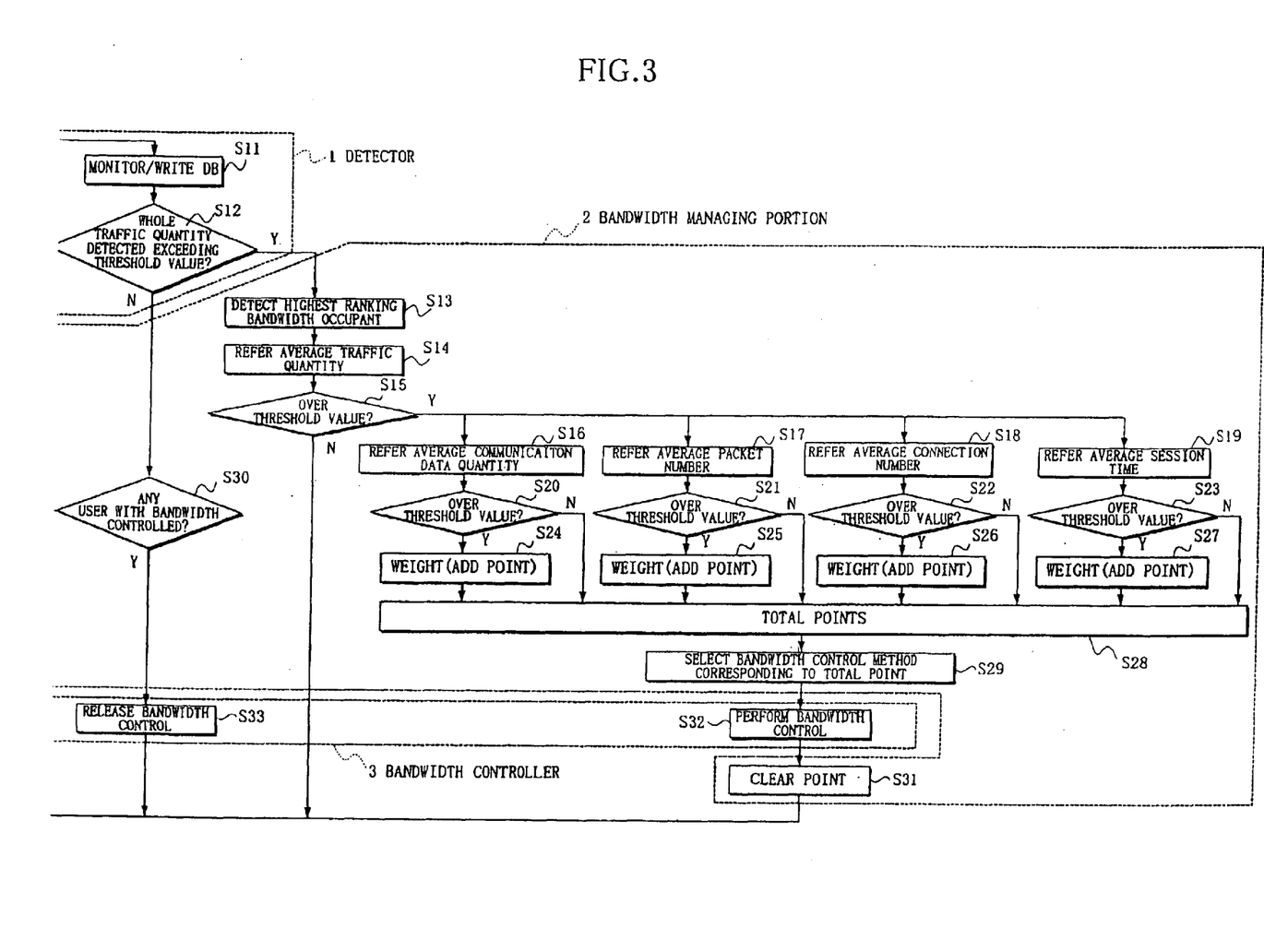
FIG. 3 is a flow chart showing an operation embodiment of an LAN network control apparatus according to the present invention.

FIG. 3 shows an embodiment of an operation of an LAN network control apparatus according to the present invention shown in FIGS. 1 and 2. In addition, the embodiments of the tables T1–T4 in the database DB shown in FIG. 2 are respectively shown in FIGS. 4–6 and FIG. 8. Referring to these tables, the operation example of FIG. 3 will now be described.

It is to be noted that the detector 1 is composed of steps S11 and S12, the bandwidth managing portion 2 is composed of steps S13–S31, and the bandwidth controller 3 is composed of steps S32 and S33, as seen in FIG. 3.

The detector 1 firstly monitors a packet passing through the network corresponding to step S1 of FIG. 2, and writes the per-user-information as to the packet in the database DB (at step S11).

Figure 4:
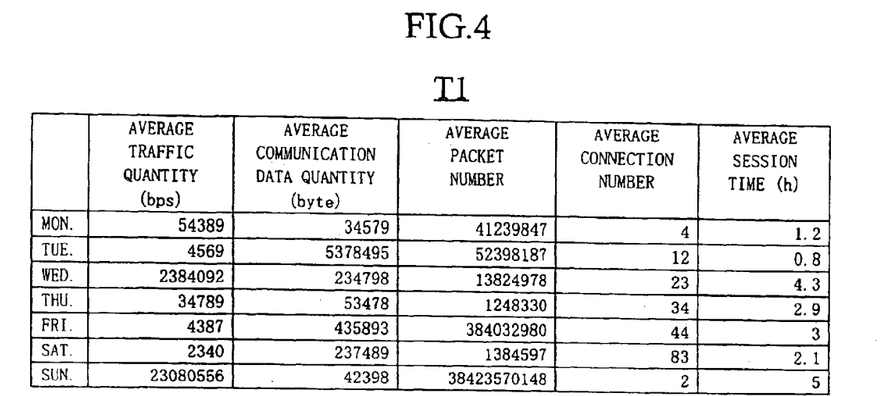
FIG. 4 is a diagram showing an embodiment of a per-user-utilizing status table T1 used in an LAN network control apparatus according to the present invention.

Being described referring to FIG. 4, the table T1 in this embodiment is composed of an average traffic quantity (bps), an average communication data quantity (byte), an average packet number, an average connection number, and an average session time (h) as the packet information per user. For this packet information, as shown in FIG. 4, the average value on each day of a week (Monday to Sunday) is calculated.

The table T1 shown in FIG. 4 is to be stored in the database DB corresponding to every user. Based on the table T1, the user ranking (order) table T2 shown in FIG. 5 as another per-user-utilizing status table indicates the ranking of the users in respect of the parameter of each packet information.

Figure 5:
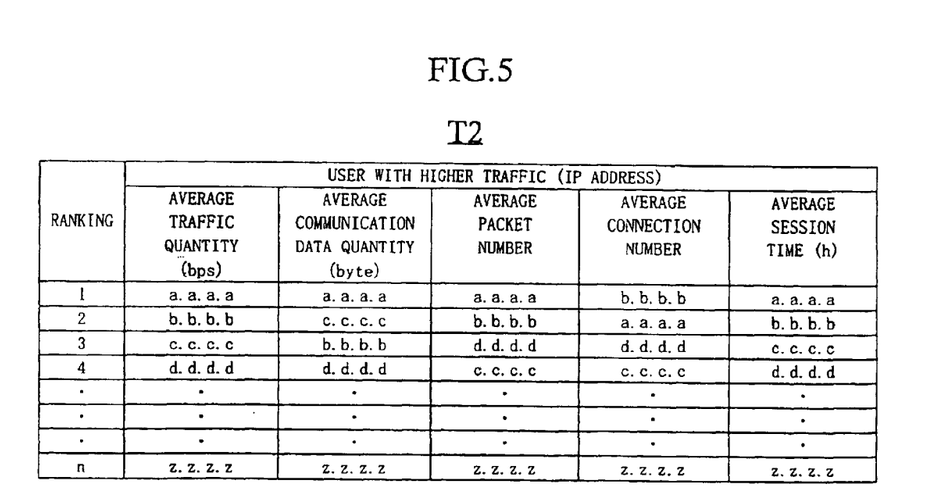
FIG. 5 is a diagram showing an embodiment of a user order table T2 used in an LAN network control apparatus according to the present invention.

Namely, when the average traffic quantities shown in FIG. 4 are totaled per user to determine the ranking, it is found from the example of FIG. 5 that a user with an IP address "a.a.a.a" is the highest ranking bandwidth occupant, and a user with an IP address "z.z.z.z" is the "n"th bandwidth occupant. Similarly, the orders of the users in respect of the average communication data quantity, the average packet number, the average connection number, and the average session time are determined in the table T2.

Thus, when the write in the database DB is performed, the detector 1 determines whether or not the traffic quantity of the whole packets passing through the network exceeds the threshold value for the above-mentioned step S2 (at step S12).

The whole traffic quantity in this embodiment is the total value of the average traffic quantities of the whole users in the table T1 shown in FIG. 4.

As a result, when it is found that the whole traffic quantity exceeds the threshold value, the process proceeds to step S13 in the bandwidth managing portion 2 to detect the highest ranking user as the bandwidth occupant (at step S13). This detection is made by referring to the ranking of the users in respect of the average traffic quantity shown in table T2 of FIG. 5, the highest ranking user (the user with the IP address "a.a.a.a" in this example).

Since the highest ranking bandwidth occupant has been detected, the bandwidth managing portion 2 refers to the table T1 on this user (at step S14), and determines whether or not any of the average traffic quantities exceeds the threshold value (at step S15). For example, assuming that the average traffic quantity for one week is a threshold value, whether or not the average traffic quantity "54389 (bps)" on Monday exceeds this threshold value is determined.

As a result, if it is found that the average traffic quantity exceeds the threshold value, the process proceeds to steps S16–S19.

At step S16, referring to the average communication data quantity in the table T1 for another packet information parameter, whether or not the average communication data quantity exceeds the threshold value is determined e.g. with the average value for one week being made the threshold value as above-noted (at step S20).

When it is found that the average communication data quantity at this time exceeds the threshold value, weighting indicating a bandwidth occupation degree is performed (at step S24). At this step, a predetermined point such as "1" is added thereto. When it is found that the average communication data quantity does not exceed the threshold value, such an addition is not performed.

Similarly, as shown in steps S17, S21, and S25, the average packet number is compared with a predetermined threshold value such as average value for one week. Only when it exceeds the threshold value, the weighting (point addition) is performed.

Moreover, as shown in steps S18, S22, and S26, the average connection number is compared with a threshold value (e.g. average value of a week), and only when it exceeds the threshold value, the weighting (point addition) is performed.

Furthermore, as shown in steps S19, S23, and S27, the average session time is compared with a threshold value such as average value for one week. Only when it exceeds the threshold value, the weighting (point addition) is performed.

It is to be noted that only when the average traffic quantity exceeds the threshold value at step S14 in the above-mentioned embodiment, the weighting of the parameters shown at steps S16–S19 is performed, however, that these five parameters can be replaced with each other.

For example at step S14 it is also possible that the average packet number is referred to, and only when the average packet number exceeds the threshold value, the weighting for other parameters, i.e. average traffic quantity, average communication data quantity, average connection number, and average session time is performed.

After performing the weighting for the parameter of the packet information (adding point) in this way, these points are totaled (at step S28). Then, according to the total point, the bandwidth control method is selected (at step S29).

Figure 6:
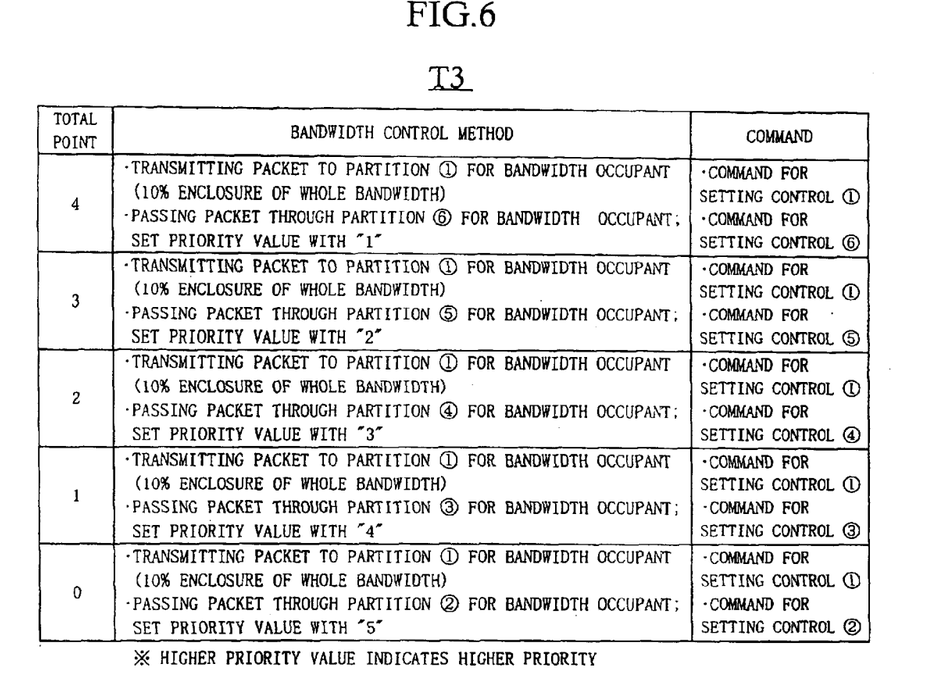
FIG. 6 is a diagram showing an embodiment of a bandwidth control method selection table T3 used in an LAN network control apparatus according to the present invention.

In the bandwidth control method selection table T3 shown in FIG. 6, the total point, the contents of the bandwidth control method, and the command are preset.

The contents of the bandwidth control method shown in this table T3 will now be described referring to the example of FIG. 7.

Assuming that the total point is "3" for example, the packet of the concerned bandwidth occupant is transmitted to a partition ① for the bandwidth occupant corresponding to 10% of the whole bandwidth of the transmission line L, a priority value is set with "2" at the time the packet is passed through the partition ①, and the commands for setting a control method ① and for setting a control method ⑤ are respectively transmitted to the bandwidth controller 3.

It is to be noted that the higher the priority value the higher the priority ranking. Accordingly, when the total point is "0" for example, the priority value is set with "5", and the packet transmission to the partition ① for the bandwidth occupant is executed without fail because of the highest priority. However, the lower the priority ranking is, the later the transmission to the partition ① will be executed.

Thus, the bandwidth managing portion 2 selects the bandwidth control method corresponding to the total point, and the bandwidth controller 3 to which the command is given performs the bandwidth control and notifies the bandwidth managing portion 2 of the release of the bandwidth control. Receiving the release notification of the bandwidth control, the bandwidth managing portion 2 clears the total point of the corresponding user (at step S31).

Namely, when the bandwidth control is performed (at step S32), a part of the bandwidth is to be confined in the partition ①. Therefore, the traffic quantity of the packet by the general user shown in FIG. 7 is decreased. This bandwidth control is continued until the whole traffic quantity at step S12 becomes less than the threshold value.

When the whole traffic quantity of the packets passing through the network becomes less than the threshold value at step S12, it is determined whether or not the user exists (at step S30) to whom a bandwidth control is performed in this status. When such a user exists, as shown in the per-user-total point table T4 in FIG. 8, in the bandwidth control immediately before, the bandwidth control to the concerned user is released (at step S33).

Figure 8:
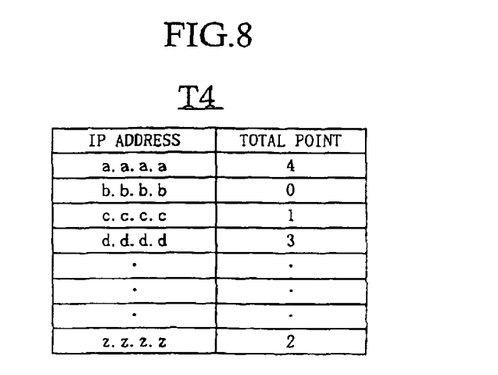
FIG. 8 is a diagram showing an embodiment of a per-user-total point table T4 used in an LAN network control apparatus according to the present invention.

However, in case that the bandwidth control is performed to a plurality of users as shown in FIG. 8, the bandwidth control is sequentially released in order from the user with a smaller point, whereby the deletion of the total point is executed (at step S31). This is for restraining a control gain and for avoiding a sudden increase and decrease of the bandwidth.

It is to be noted that the table T4 shown in FIG. 8 is prepared corresponding to the IP address for the total point per user at the time the bandwidth managing portion 2 has totaled the points (at step S28).

As described above, a network control apparatus according to the present invention is arranged such that when a whole traffic quantity of a packet passing through the network exceeds a threshold value, per-user-information is analyzed based on a database holding packet information, and a bandwidth control method in conformity with the analysis result is selected to perform/release the bandwidth control. Therefore, it becomes possible to dynamically and flexibly control a backbone traffic according to a utilizing status per user changing with time, to control an unbalanced traffic by some bandwidth occupants, to effectively make use of the backbone, and in turn to suppress the cost of the backbone as increased in speed.

What we claim is:

1. A network control apparatus comprising:
   a detector detecting a packet passing through a network and a fact that a whole traffic quantity exceeds a predetermined threshold value,
   a database holding packet per-user-information detected by the detector,
   a bandwidth managing portion detecting a bandwidth occupant based on the per-user-information in the database and selecting a corresponding bandwidth control method when the detector has detected that the whole traffic quantity has exceeded the predetermined threshold value, and
   a bandwidth controller performing a bandwidth control to the bandwidth occupant based on the bandwidth control method selected by the bandwidth managing portion;

wherein the database has a utilizing status table per user including per-user information parameters, a user ranking table indicating a ranking of users with respect to each information parameter, a total point table per user totals points of the information parameters, and a bandwidth control method selection table indicating correspondence between the total points per user and the bandwidth control method.

2. The network control apparatus as claimed in claim 1 wherein the detector has a variable value as the predetermined threshold value.

3. The network control apparatus as claimed in claim 1 wherein the utilizing status table per user including at least one of an average traffic quantity, an average communication data quantity, an average packet number, an average connection number, and an average session time as a parameters of the per-user-information.

4. The network control apparatus as claimed in claim 3 wherein the bandwidth managing potion detects a highest ranking bandwidth occupant at one specified parameter based on the user ranking table, determines whether or not a value of another parameter exceeds a corresponding predetermined threshold value by referring to the utilizing status table per user when the value of the specified parameter at this time exceeds a corresponding predetermined threshold value, gives points indicating a bandwidth occupation degree when the threshold value is exceeded, and selects the bandwidth control method based on the point at this time.

5. The network control apparatus as claimed in claim 4 wherein the bandwidth control method has contents of a transmission of packet to a partition for a bandwidth occupant and a priority ranking at a time the packet is passed through the partition.

6. The network control apparatus as claimed in claim 4 wherein the bandwidth managing portion totals points of the parameters in the utilizing status table per user.

7. The network control apparatus as claimed in claim 6 wherein when the whole traffic quantity is less than the predetermined threshold value after performing the bandwidth control, the bandwidth controller sequentially releases the bandwidth control in order from a user with a smaller point based on the total point table per user, whereby the bandwidth managing portion clears the point of the user of which bandwidth control is released.

* * * * *